United States Patent [19]

Miller et al.

[11] 4,266,174

[45] May 5, 1981

[54] COMPACTOR CONTROL WITH SELECTIVE PAUSE OPERATION

[75] Inventors: Frank E. Miller, Mercer County, Ky.; James J. Anderson, Fremont, Ohio

[73] Assignee: Whirlpool Corporation, Benton Harbor, Mich.

[21] Appl. No.: 68,972

[22] Filed: Aug. 23, 1979

[51] Int. Cl.³ .......... H02P 1/40

[52] U.S. Cl. .......... 318/753

[58] Field of Search .......... 307/112; 318/739, 749, 318/753, 754, 755

[56] References Cited

U.S. PATENT DOCUMENTS

| | | | |
|---|---|---|---|
| 2,611,888 | 9/1952 | Richards | 318/753 X |
| 2,661,450 | 12/1953 | Moler | 318/753 |
| 3,611,083 | 10/1971 | Halsted | 318/755 |
| 3,720,844 | 3/1973 | Sahs | 318/755 X |
| 3,805,084 | 4/1974 | Schuerman et al. | 307/112 |

*Primary Examiner*—Gene Z. Rubinson

*Attorney, Agent, or Firm*—Wegner, Stellman, McCord, Wiles & Wood

[57] ABSTRACT

A refuse compactor having a selector switch for causing the ram to be automatically retained in the compacting position when desired. The control of the compactor is also arranged to provide an automatic movement of the ram to the compacting position and then to a retracted position with the selector switch permitting such automatic cycling, when desired. A signal device is associated with the control to provide an indication of the retention of the ram in the compacting position when the compactor is so arranged. The control may include centrifugal switches and a selector switch for selectively controlling energization of individual forward and reverse start windings of the drive motor for selectively moving the ram.

12 Claims, 3 Drawing Figures

COMPACTOR CONTROL WITH SELECTIVE PAUSE OPERATION

BACKGROUND OF THE INVENTION

1. Technical Field

This invention relates to refuse compactors and in particular to means for controlling the position of the compacting ram in a refuse compactor.

2. Background Art

In conventional refuse compactors, a ram is caused to move from a retracted position against refuse contained in a suitable receptacle so as to cause desired compaction of the refuse therein. The compactor apparatus includes means for effecting an automatic retraction of the ram to a retracted position when the compacting force reaches a preselected value.

It has been found that by maintaining the compacting force against the refuse rather than immediately causing retraction of the ram, an increased amount of compaction of the refuse can be effected. A number of devices have been developed for effecting such maintained compacting force operation in such compactor apparatuses.

Illustratively, in U.S. Pat. No. 3,229,618 of Leon P. O'Connor, Jr., a refuse disposal apparatus is shown wherein hydraulic pressure is maintained at a preselected maximum so as to maintain a packer plate in an extended limit position until a forward switch is released to effect a return of the packer plate to the retracted position. Such retention of the packer plate in the extended position is effected so as to facilitate securing of the retainer plate to the receiver when the receiver has been filled to a maximum capacity. Specifically, when the receiver has been filled to maximum capacity, the forward switch is actuated to move and hold the packer plate in a fully extended position. In this position, the latch mechanism is actuated to release the retainer plate and the retainer rods are employed to secure the retainer plate over the entrance opening in the receiver, permitting the receiver to be detached from the packer unit so as to be hauled to a final disposal area, as desired.

In U.S. Pat. No. 3,855,919, Richard W. Potter shows a control system for a compacting apparatus including signal lamps for showing the direction of movement of the ram. The apparatus includes a time delay circuit for automatically shutting down the compactor when any of the operational cycles thereof continues beyond a predetermined time limit.

In U.S. Pat. No. 3,398,433 of Charles J. Borum, a trash compactor with a clock timer control is disclosed for providing an extended delay period after a compacting stroke. The clock is provided to permit the automatic extended compaction at a period of time during the day when the compactor is unlikely to be in use for a substantial length of time. The control operates the ram independently of any manual initiation of the apparatus to effect the compacting stroke at the predetermined time and to cause the stopping of the ram for the delay period during that independently initiated compaction stroke.

Einar O. Engebretsen shows a compactor cycle control in U.S. Pat. No. 3,962,964 wherein a dwell period is provided at the end of the compaction cycle. In the Engebretsen control, a centrifugal switch closes just before the ram drive motor stops so as to complete a reverse starting circuit through the apparatus direction switch. A circuit breaker in the apparatus opens in response to the heavier starting current so as to open a bypass circuit around the start switch and cause the motor, which is in the process of reversing, to stop. Engebretsen teaches that the reversal movement is stopped almost instantaneously so that any retraction from the bottom-most point of travel would be little. Thus, the amount of actual retraction is a function of the rapidity with which the circuit breaker opens in response to the reversal starting current. In an alternative embodiment, Engebretsen teaches the use of a start relay which has its holding circuit opened at the point of maximum compaction, to thereby effect a pause cycle.

SUMMARY OF THE INVENTION

The present invention comprehends an improved refuse compactor control with means for permitting the user to select either a normal cycle wherein the ram automatically retracts at the end of each compaction operation, or a pause cycle wherein the ram is prevented from being reversed at the end of the compaction operation until the user manually operates the control to effect such retraction.

The compactor control includes a signal means for indicating to the user that the ram is in the "pause" mode, requiring the ram to be first retracted by manual actuation of the retraction control before effecting subsequent compaction operations.

More specifically, the invention comprehends provision in a refuse compactor having a compacting ram, a drive motor having a run winding, a forward start winding and a reverse start winding, of control means controlling the energization of the drive motor for selectively (a) causing the ram to be returned to a retracted position as an incident of the ram meeting a preselected resistance to compacting movement, or (b) causing the ram to be retained in the compacting position upon the ram meeting the preselected resistance, the control means including selector switch means selectively providing a first circuit to the run winding and to the reverse start winding for energizing the reverse start winding upon the drive motor stalling in the compacting position, and a second circuit for causing the run winding to become de-energized and both the run winding and reverse start winding to be maintained de-energized upon the drive stalling in the compacting position, the control means further including manually operable switch means for energizing the run and reverse start windings when so de-energized by the second circuit, and means for causing the drive means to return the ram to the retracted position subsequent to the ram being caused to be retained in the compacting position.

The selector switch may comprise a single pole, double throw switch.

In the illustrated embodiment, the reverse start winding is connected to the power source through a centrifugal switch, permitting the reverse start winding to be energized by either of the first or second circuits only when the drive motor speed is below a preselected low speed.

Further, the second circuit may include a second centrifugal switch permitting the run winding to be energized only when the drive motor speed is at least the preselected speed, with the selector switch being arranged to provide the second circuit to the reverse start winding.

The two centrifugal switches may be arranged for concurrent operation.

The signal device may be connected in parallel with the selector switch means and in series with the motor start winding. Thus, the control means may cause energization of the signal means as an incident of the selector switch being arranged to provide the second circuit, with the second circuit maintaining the run and reverse start windings of the motor de-energized.

In the illustrated embodiment, the pause switch comprises a single pole, double throw switch. The compactor control eliminates the need for holding relays and the like, thereby providing improved energy efficiency by avoiding the need for energizing electromagnetic relays and the like requiring powered energization in the selective use thereof.

The refuse compactor structure of the present invention is extremely simple and economical of construction while yet providing the highly desirable features discussed above.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENT

Figure 1:
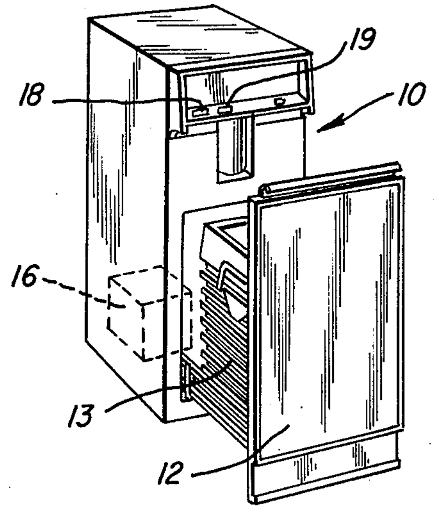
FIG. 1 is an isometric view of a refuse compactor having an improved pause control embodying the invention.

In the exemplary embodiment of the invention as disclosed in the drawing, a refuse compactor generally designated 10 is shown to be provided with a cabinet 11 having a selectively movable front door 12 for providing access to a refuse receptacle 13 normally disposed within the cabinet in a compaction position. In the embodiment shown, the door 12 is fixed to the receptacle with the receptacle defining a movable drawer which may be guided between the compacting position and a forwardly exposed, upwardly opening position, as shown in FIG. 1, for receiving refuse and the like.

Figure 3:
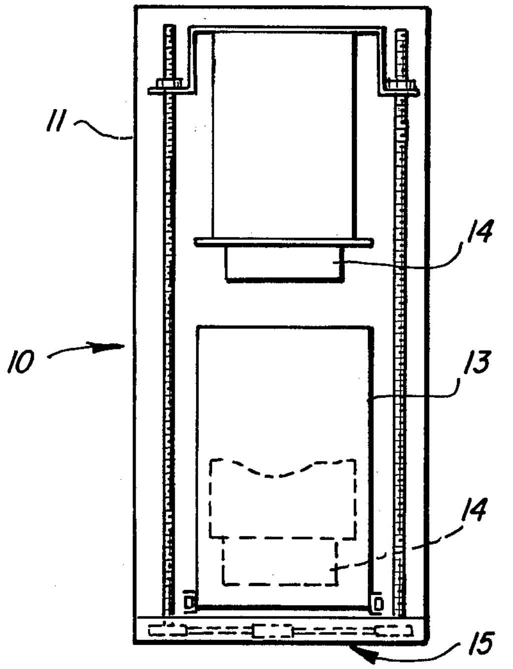
FIG. 3 is a schematic vertical section of the refuse compactor illustrating schematically the association of the ram and receptacle within the compactor cabinet.

Compaction of refuse in receptacle 13 is effected by means of a conventional ram 14 (FIG. 3) which is driven by a drive generally designated 15, including an electric motor 16 so as to move the ram 14 from a retracted position, as shown in full lines in FIG. 3, downwardly into the receptacle 13 to a compacting position, such as shown in dotted lines in FIG. 3.

As indicated above, the compactor includes a control generally designated 17 for controlling the operation of the drive motor 16 suitably to effect the desired movement of ram 14 by the drive 15. As indicated briefly above, the improved control 17 includes a pause switch 18 which may be selectively operated by the user so as to effect a pause in the movement of the ram 14 when desired, so as to maintain a compaction force against the refuse in receptacle 13. The control includes a signal device, such as signal light 19, for indicating to the user the retention of the ram in the "pause" mode. As can be seen by reference to FIG. 3, when the ram is retained in the compacting position shown in dotted lines therein, the receptacle 13 cannot be moved from the cabinet 11 and, thus, it is necessary for the user to remove the control from the "pause" mode and permit the ram to move to the retracted position above the receptacle so that the receptacle can then be moved forward from the cabinet to the open refuse receiving position.

The electrical circuitry of the compactor may be energized from a suitable power source such as a 120-v. alternating current power source, indicated by power supply leads L1 and L2. Connected in series from power supply lead L1 is a power safety switch 20 and a run switch 21. A normally open momentary contact start switch 22 is connected from switch 21 to the run winding 23 of the drive motor 16, which is connected through an over-current protector 24 to power supply lead L2.

Drive motor 16 further includes a forward start winding 25 and a reverse start winding 26, which are connected through a centrifugal switch 27 to a junction 39 between the run winding 23 and over-current protective device 24.

The start windings 25 and 26 are selectively energized through a directional switch generally designated 28 having a moving contact 29 connected to a junction 30 between the start pushbutton 22 and run winding 23. A first fixed contact 31 of the directional switch 28 is connected to forward start winding 25 and a second fixed contact 32 of the directional switch is connected to the reverse start winding 26.

The directional switch may be ganged with a top limit switch generally designated 33 having a moving contact 34 connected to the moving contact 35 of a pause switch 18. The top limit switch includes a fixed contact 37 connected to the junction 38 between run switch 21 and start switch 22.

Figure 2:
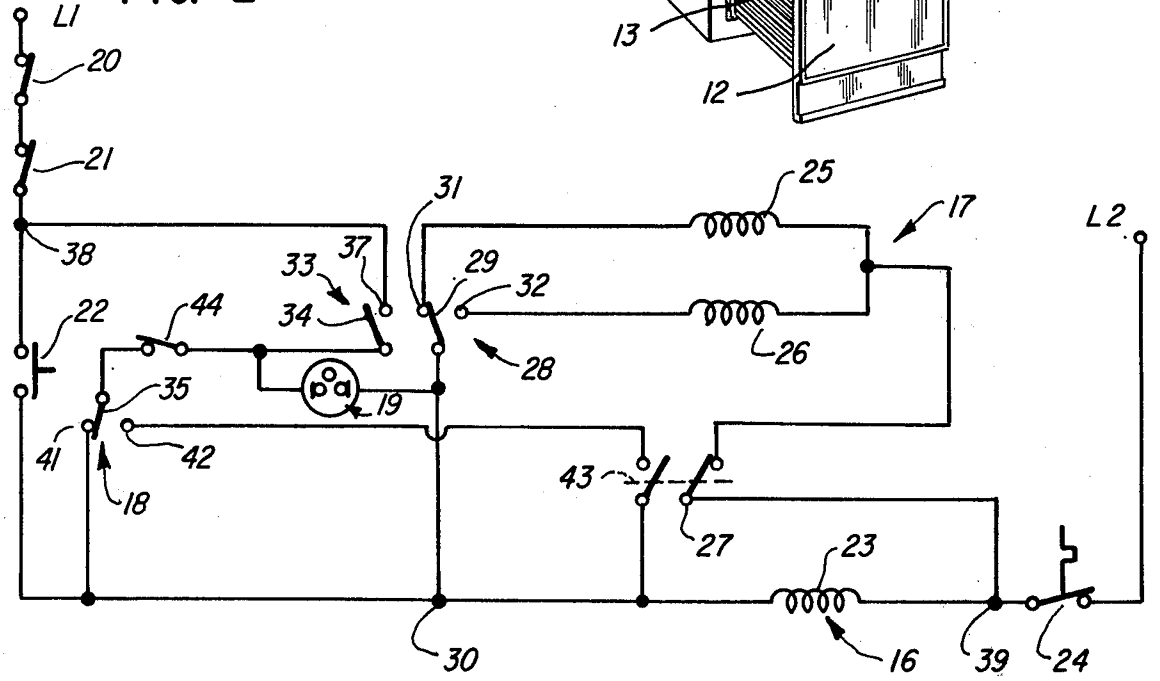
FIG. 2 is a schematic wiring diagram illustrating the circuitry of the improved pause control.

As indicated above, the directional switch 28 and top limit switch 33 are ganged so that each of them is thrown from the position shown in FIG. 2 substantially immediately after the ram 14 starts moving downwardly from the retracted position shown in full lines in FIG. 3.

Connected between moving contact 29 of switch 28 and moving contact 34 of switch 33 is the signal device 19 illustratively comprising a lamp which, in the illustrated embodiment, comprises a long life neon lamp utilizing effectively minimum power.

A normally closed tilt switch 44 is interposed between switches 33 and 35. The tilt switch 44 is positioned in the compactor so as to be opened by mechanical displacement of the receptacle 13 from its desired compacting position, to thereby prevent operation of motor 16 until the receptacle is restored to its normal position.

Pause switch 18 includes a first fixed contact 41 connected to junction 30 and a second fixed contact 42 connected through a second centrifugal switch 43 to junction 30. Thus, depending on the position of the pause switch as controlled by the user, power is delivered to junction 30 either directly from top limit switch 33, i.e. through fixed contact 41, or through the second centrifugal switch 43, i.e. fixed contact 42. As shown in FIG. 2, the centrifugal switches 27 and 43 may be ganged so as to be operable at the same speed of the drive motor 16.

The operation of the compactor utilizing the improved pause control switch 18 is extremely simple and energy efficient. The control circuit 17 will be arranged with the switches as shown in FIG. 2 when the ram is in the retracted position of FIG. 3, with the pause switch 18 set for a non-pause mode of operation. When the user desires to effect a compacting operation, he merely presses start pushbutton switch 22 so as to close the circuit from power supply lead L1 to the run winding 23 and through the directional switch 28 to the forward start winding 25. The forward start winding will be briefly energized to start the operation of the drive motor 16 in the forward direction, whereupon the centrifugal switch 27 is thrown to the open condition, thereby breaking the circuit from the forward start winding 25 while allowing the motor to continue to run in the forward direction by continued energization of the run winding 23. Such continued energization is effected by the parallel circuit around pushbutton switch 22 through the top limit switch which closed upon the initial downward movement of the ram 14, and the pause switch 18 having its moving contact 35 engaging fixed contact 41. At the same time that top limit switch 33 is thrown to the closed position, directional switch 28 has its moving contact 29 thrown from fixed contact 31 into engagement with fixed contact 32. However, at this time, no energization of the reverse start winding 26 may be effected because of the open circuit condition of centrifugal switch 27.

When ram 14 reaches the compacting position shown in dotted lines in FIG. 3, the high resistance to further forward movement causes the drive motor 16 to slow down substantially, thereby causing centrifugal switch 27 to be restored to the closed circuit condition shown in FIG. 2. The circuit through directional switch 28 now permits the reverse start winding 26 to be energized through the centrifugal switch 27, thereby effecting a reverse movement of the ram back to the retracted position shown in full lines in FIG. 3. The ram is stopped in the retracted position by the opening of the top limit switch 33, which breaks the circuit around the start switch 22 at that time.

When the user decides to operate the compactor in the pause mode, he merely operates pause switch 18 to manually switch the moving contact 35 thereof from engagement with fixed contact 41 into engagement with fixed contact 42. When the user depresses the start pushbutton 22 with the pause switch thus arranged, the circuit to the forward winding 25 is made as previously described. When the centrifugal switch 27 disconnects the start winding 25, the circuit is maintained from power supply lead L1 to the run winding 23 through the centrifugal switch 43 which closes when the drive motor starts running. Thus, the drive motor will continue to operate in the forward direction until resistance to further downward movement of the ram 14 causes a decrease in the speed of the drive motor to switch the centrifugal switches 43 and 27 back to the full line showing in FIG. 2. This switching of centrifugal switch 43 opens the circuit from pause switch 18 to the run winding 23, thereby positively stopping the compacting operation.

The ram 14 will be maintained in the compacting position until the user presses the start button 22 or returns switch 18 to its non-pause position to complete the circuit from power supply L1 through the directional switch 28 which has its moving contact 29 now in engagement with fixed contact 32 to the reverse start winding 26, which is connected to the power supply lead L2 through the now closed centrifugal switch 27. This causes the ram to move back from the compacting position shown in dotted lines in FIG. 3 to the retracted position shown in full lines therein.

If pause switch 18 has been left in the pause position, a subsequent depressing of the start button 22 will initiate a downward movement of the ram back to the dotted line position, as seen in FIG. 3, where the ram will be maintained in compacting position relative to the refuse in receptacle 13, as discussed above.

To restore the apparatus to the normal mode of operation, the user need merely operate the pause switch 18 back to the normal position wherein the moving contact 35 engages fixed contact 41 thereof so that the compactor operation will then proceed in the manner first described above.

Thus, the invention comprehends an improved control 17 eliminating the need for a holding relay and permitting the use of a simple single pole, double throw selector switch 18. The signal lamp 19 provides to the user a clear indication of the compactor being disposed in the retained compacting position with this indicating means consuming negligible power in providing the indication.

Thus, the control 17 is highly energy efficient while yet providing an improved compaction operation wherein the ram effectively positively maintains the maximum compaction force by effectively preventing any reverse operation prior to de-energizing of the drive motor.

Thus the present invention provides an improved refuse compactor control in a novel and economical manner.

The foregoing disclosure of specific embodiments is illustrative of the broad inventive concepts comprehended by the invention.

Having described the invention, the embodiments of the invention in which an exclusive property or privilege is claimed are defined as follows:

1. In a refuse compactor having a compacting ram, drive means for driving the ram selectively in a compacting movement to a compacting position and in a retracting movement to a retracted position, the improvement comprising:

control means controlling the drive means for selectively (a) causing the ram to be returned to said retracted position as an incident of the ram meeting a preselected resistance to compacting movement, and (b) causing the ram to be retained in said compacting position upon the ram meeting said preselected resistance;

means for causing the control means to return the ram to said retracted position subsequent to the ram being caused to be retained in said compacting position; and indicator means indicating the retention of the ram in said compacting position.

2. The refuse compactor structure of claim 1 wherein said drive means includes a drive motor having oppositely acting start windings and said control means includes a directional switch for selectively connecting the motor through either of said oppositely acting start windings.

3. The refuse compactor structure of claim 1 wherein said drive means includes a drive motor having oppositely acting start windings and said control means includes a single pole, double throw directional switch for selectively connecting the motor through either of said oppositely acting start windings.

4. The refuse compactor structure of claim 1 wherein said indicator means comprises visual signal means.

5. In a refuse compactor having a compacting ram, drive means including a drive motor having a run winding, a forward start winding and a reverse start winding, for driving the ram selectively in a compacting movement to a compacting position and in a retracting movement to a retracted position, the improvement comprising:

control means controlling the energization of the drive motor for selectively (a) causing the ram to be returned to said retracted position as an incident of the ram meeting a preselected resistance to compacting movement, and (b) causing the ram to be retained in said compacting position upon the ram meeting said preselected resistance, said control means including selector switch means selectively providing a first circuit to the run winding and to the reverse start winding for energizing the reverse start winding upon the drive motor stalling in the compacting position, and a second circuit for causing the run winding to become de-energized and both the run winding and reverse start winding to be maintained de-energized upon the drive stalling in the compacting position, said control means further including manually operable switch means for energizing the run and reverse start windings when so de-energized by said second circuit; and means for causing the control means to return the ram to said retracted position subsequent to the ram being caused to be retained in said compacting position.

6. The refuse compactor of claim 5 wherein said selector switch means comprises a single pole, double throw switch.

7. The refuse compactor of claim 5 wherein said reverse start winding is connected to the power source through a centrifugal switch permitting said reverse start winding to be energized by either of said first and second circuits only when the drive motor speed is below a preselected low speed.

8. The refuse compactor of claim 5 wherein said reverse start winding is connected to the power source through a centrifugal switch permitting said reverse start winding to be energized by either of said first and second circuits only when the drive motor speed is below a preselected low speed, and said second circuit includes a second centrifugal switch permitting said run winding to be energized only when the drive motor speed is at least said preselected speed with the selector switch arranged to provide said second circuit to said reverse start winding.

9. The refuse compactor of claim 5 wherein said reverse start winding is connected to the power source through a centrifugal switch permitting said reverse start winding to be energized by either of said first and second circuits only when the drive motor speed is below a preselected low speed, and said second circuit includes a second centrifugal switch permitting said run winding to be energized only when the drive motor speed is at least said preselected speed with the selector switch arranged to provide said second circuit to said reverse start winding, said centrifugal switches being arranged for concurrent operation.

10. The refuse compactor of claim 5 wherein a signal device is connected in parallel with said selector switch means and in series with said start windings, said control means causing energization of said signal as an incident of said selector switch being arranged to provide said second circuit and said second circuit is maintaining said run and reverse start windings de-energized.

11. The refuse compactor of claim 5 wherein said reverse start winding is connected to the power source through a centrifugal switch permitting said reverse start winding to be energized by either of said first and second circuits only when the drive motor speed is below a preselected low speed, and said second circuit includes a second centrifugal switch permitting said run winding to be energized only when the drive motor speed is at least said preselected speed with the selector switch arranged to provide said second circuit to said reverse start winding, said control means further including a signal device connected in parallel with said selector switch and second centrifugal switch and in series with said reverse start winding whereby said signal device is energized as an incident of said selector switch being arranged to provide said second circuit and said second circuit is maintaining said run and reverse start windings de-energized.

12. The refuse compactor of claim 5 wherein a signal device is connected in association with said selector switch means for providing an indication of the retention of the ram in said compaction position by said control means.

* * * * *